(12) United States Patent
Ooishi

(10) Patent No.: US 9,843,693 B2
(45) Date of Patent: Dec. 12, 2017

(54) IMAGE READING APPARATUS AND IMAGE FORMING SYSTEM

(71) Applicant: Konica Minolta, Inc., Chiyoda-ku, Tokyo (JP)

(72) Inventor: Akihiko Ooishi, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/411,343

(22) Filed: Jan. 20, 2017

(65) Prior Publication Data

US 2017/0223204 A1    Aug. 3, 2017

(30) Foreign Application Priority Data

Feb. 2, 2016  (JP) ................. 2016-017779

(51) Int. Cl.
| | |
|---|---|
| *G06F 15/00* | (2006.01) |
| *H04N 1/00* | (2006.01) |
| *G03G 15/043* | (2006.01) |
| *H04N 1/04* | (2006.01) |
| *B65H 5/06* | (2006.01) |

(52) U.S. Cl.
CPC ......... *H04N 1/00588* (2013.01); *B65H 5/062* (2013.01); *B65H 5/066* (2013.01); *B65H 5/068* (2013.01); *G03G 15/043* (2013.01); *H04N 1/0066* (2013.01); *H04N 1/00602* (2013.01); *H04N 1/00615* (2013.01); *H04N 1/0464* (2013.01); *B65H 2801/06* (2013.01); *H04N 2201/0081* (2013.01); *H04N 2201/0094* (2013.01)

(58) Field of Classification Search
CPC .......... H04N 1/00588; H04N 1/00602; H04N 1/00615; H04N 1/0066; H04N 1/0464; H04N 2201/0081; H04N 2201/0094; G03G 15/043; B65H 5/062; B65H 5/066; B65H 5/068
USPC ....................................................... 358/1.14
See application file for complete search history.

(56) References Cited

U.S. PATENT DOCUMENTS

2014/0062007 A1* 3/2014 Otsuki ............... G03G 15/6561
                                                                 271/226
2014/0293374 A1* 10/2014 Nakayama ......... H04N 1/00588
                                                                 358/498

FOREIGN PATENT DOCUMENTS

JP           2014177335 A          9/2014

* cited by examiner

*Primary Examiner* — Saeid Ebrahimi Dehkordy
(74) *Attorney, Agent, or Firm* — Cantor Colburn LLP

(57) ABSTRACT

An image reading apparatus includes a scanner structured to reads an image formed on a medium which is conveyed; a calibration member located opposite to the scanner and structured to reflect irradiation light to be radiated to the medium when reading an image; a first roller arranged in a fixed position and structured to guide a conveying direction of the medium passing between the scanner and the calibration member; and a second roller arranged in a variable position in accordance with the stiffness of the medium and structured to guide the conveying direction of the medium passing between the scanner and the calibration member.

8 Claims, 12 Drawing Sheets

- - - - - with guide member1740 (lower guide1741 and upper guide1743)
·········· with guide member740 (first rolloer741 and second roller743)

- - - - - with guide member1740 (lower guide1741 and upper guide1743)
·········· with guide member740 (first rolloer741 and second roller743)

IMAGE READING APPARATUS AND IMAGE FORMING SYSTEM

CROSS-REFERENCE TO RELATED APPLICATIONS

The present application claims priority under 35 U.S.C. §119 to Japanese Patent Application No. 2016-017779, filed Feb. 2, 2016. The contents of this application are herein incorporated by reference in their entirety.

BACKGROUND OF THE INVENTION

Field of the Invention

The present invention relates to an image reading apparatus and an image forming system.

Description of Related Art

In the past, there is a system in which a nip portion of a conveyance roller is released in accordance with the thickness of a sheet which is conveyed by the conveyance roller (for example, refer to Japanese Patent Published Application No. 2014-177335).

The prior art technique described in this Published Application makes it possible to inhibit occurrence of sheet conveyance troubles by releasing a nip portion of a conveyance roller in accordance with the thickness of a sheet.

However, in the case where the prior art technique described in the Published Application is applied when reading an image formed on a sheet which is passed between a scanner and a calibration member, the sheet may move outside the area in which the reading performance of the scanner is guaranteed, depending upon the stiffness of the sheet.

For example, if the sheet is passed through a gap without pressing in accordance with the technique described in the Published Application even though the stiffness of the sheet is small, the sheet passed between the scanner and the calibration member substantially flaps in the reading position of the scanner as the conveying speed of the sheet increases. On the other hand, in the case where a sheet passing through a gap is pressed when reading an image formed on the sheet unlike in accordance with the prior art technique described in the Published Application, the occurrence frequency of conveyance troubles of the sheet passed between the scanner and the calibration member may increase as the stiffness of the sheet increases.

Accordingly, in accordance with this prior art technique, while the occurrence frequency of conveyance troubles of a medium such as a sheet can be inhibited, it is impossible to inhibit the medium from flapping in the reading position of the scanner so that an image formed on the medium may not correctly be read.

The present invention is made in order to solve such a prior art problem and it is an object of the present invention to provide an image reading apparatus and an image forming system in which it is possible to decrease the occurrence frequency of conveyance troubles of a medium and correctly read the image formed on the medium.

SUMMARY OF THE INVENTION

To achieve at least one of the above-mentioned objects, reflecting one aspect of the present invention, an image reading apparatus comprises: a scanner structured to read an image formed on a medium which is conveyed; a calibration member located opposite to the scanner and structured to reflect irradiation light to be radiated to the medium when reading an image; a first roller arranged in a fixed position and structured to guide a conveying direction of the medium passing between the scanner and the calibration member; and a second roller arranged in a variable position in accordance with the stiffness of the medium and structured to guide the conveying direction of the medium passing between the scanner and the calibration member, wherein the arrangement position of the second roller varies only within a range in which the reading performance of the scanner is guaranteed while pressing the medium.

Also, the image reading apparatus of the present invention further comprises a loading unit which applies a load to the second roller to press the medium.

Furthermore, in accordance with the image reading apparatus of the present invention, it is preferred that the loading unit is provided with a resilient member which generates a resilient force in response to a reaction which is applied to the second roller from the medium, and wherein the resilient member applies the load to the second roller by of the resilient force.

Furthermore, in accordance with the image reading apparatus of the present invention, it is preferred that the loading unit is provided with a drive unit which generates a pressing force in accordance with the stiffness of a medium, and wherein the drive unit applies the load to the second roller by the pressing force when the medium is passed through the second roller.

Furthermore, the image reading apparatus of the present invention further comprises a first conveyance unit located in the upstream side of the first roller and the second roller and arranged inclined toward the scanner to convey the medium; and a second conveyance unit located in the downstream side of the first roller and the second roller and arranged inclined toward the scanner to convey the medium.

Furthermore, in accordance with the image reading apparatus of the present invention, it is preferred that the conveying speed of the second conveyance unit for conveying the medium is set faster than the conveying speed of the first conveyance unit for conveying the medium.

Furthermore, in accordance with the image reading apparatus of the present invention, it is preferred that the scanner comprises: a point light source structured to irradiate the medium with the irradiation light; a light guide member structured to guide light which includes reflected light originating from the irradiation light of the point light source; a glass provided on the light guide member and arranged opposite to the calibration member; and an imaging device structured to image the image formed on the medium with light which is guided by the light guide members and through the glass, wherein one of the first roller and the second roller is located in the upstream side and the downstream side of the calibration member respectively, and the other of the first roller and the second roller is located in the upstream side and the downstream side of the light guide member respectively.

DETAILED DESCRIPTION OF THE PREFERRED EMBODIMENT

In what follows, several embodiments of the present invention will be explained with reference to drawings. However, the present invention is not limited to the following specific embodiments.

Embodiment 1

Figure 1:
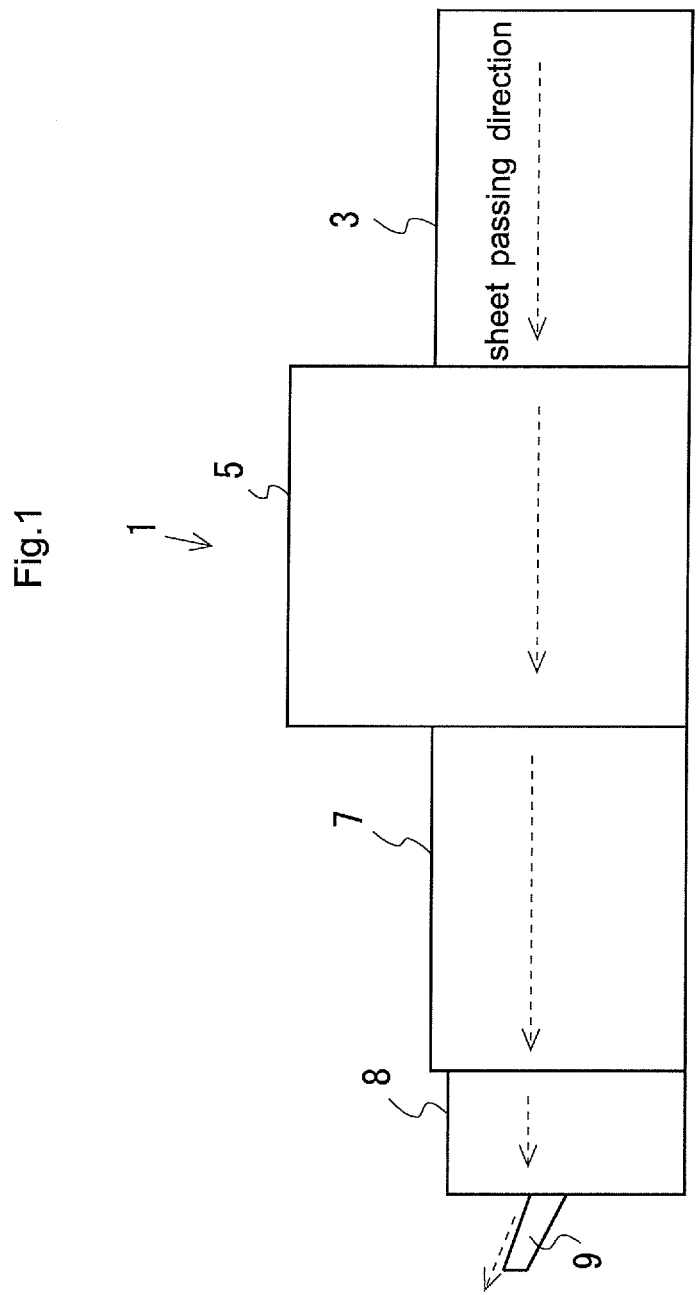
FIG. 1 is a schematic diagram for showing an example of the overall configuration of an image forming system 1 in accordance with an embodiment 1 of the present invention.

FIG. 1 is a schematic diagram for showing an example of the overall configuration of an image forming system 1 in accordance with an embodiment 1 of the present invention. As illustrated in FIG. 1, the image forming system 1 includes a paper feed apparatus 3, an image forming apparatus 5, an image reading apparatus 7 and a discharge unit 8. The paper feed apparatus 3 is responsible for feeding a sheet P to the image forming apparatus 5. The image forming apparatus 5 is responsible for forming an image on a sheet P fed by the paper feed apparatus 3. The image reading apparatus 7 is responsible for reading a sheet P on which an image is formed by the image forming apparatus 5, and performing various types of processing. The discharge unit 8 is provided with a catch tray 9, and discharges a sheet P, which is conveyed from the image reading apparatus 7, to the catch tray 9.

Figure 2:
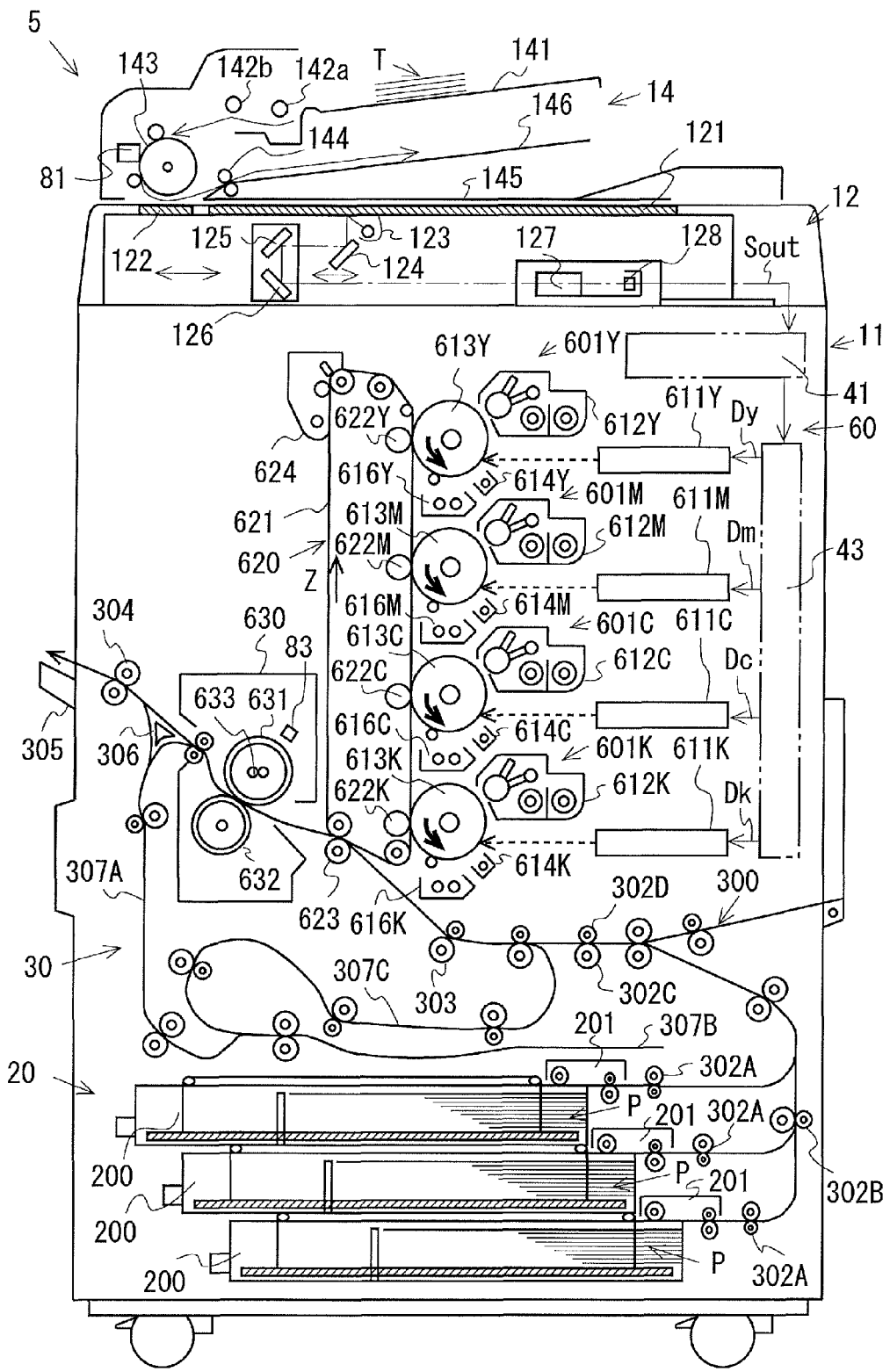
FIG. 2 is a diagram for showing an example of the configuration of an image forming apparatus 5 in accordance with the embodiment 1 of the present invention.

Next, the image forming apparatus 5 will be specifically explained. FIG. 2 is a diagram for showing an example of the internal configuration of the image forming apparatus 5 in accordance with the embodiment 1. As illustrated in FIG. 2, the image forming apparatus 5 is an example of a color copying machine which acquires image information by reading images formed on an original T, and superimposes respective colors based on the acquired image information to form a full color image. The present invention can be preferably applied to a color printer, a facsimile machine or a multi-functional peripheral thereof, as the image forming apparatus 5, besides the color copying machine.

The image forming apparatus 5 is provided with an image forming apparatus body 11. A color image reading unit 12 and an automatic document feeder 14 are installed on the top of the image forming apparatus body 11. As described in detail below, the image forming apparatus body 11 includes a control unit 41, an image processing unit 43, an image forming unit 60, a paper feed unit 20 and a conveyance unit 30.

Next, the automatic document feeder 14 will be explained. The automatic document feeder 14 is located on the image reading unit 12 and performs an operation of automatically feeding one or more original T in an automatic feeding mode. The automatic feeding mode is a mode in which an original T is fed from the automatic document feeder 14 to the image reading unit 12 which then reads an image printed on the original T.

More specifically, the automatic document feeder 14 is provided with an original placing member 141, a roller 142a, a roller 142b, a roller 143, a roller 144, a sheet reversing member 145 and a discharge tray 146. One or more original T is placed on the original placing member 141. The roller 142a and the roller 142b are located in the downstream side of the original placing member 141. The roller 143 is located in the downstream side of the roller 142a and the roller 142b. The automatic document feeder 14 is provided with a positioning sensor 81 on the outer circumference of the roller 143.

When the automatic feeding mode is selected, an original T fed from the original placing member 141 is conveyed by the roller 143 to form a U-shaped turn. Incidentally, when the automatic feeding mode is selected, an original T is placed on the original placing member 141 with its printed side facing up.

Also, after reading by the image reading unit 12, the original T is conveyed by the roller 144 and discharged onto the discharge tray 146. Meanwhile, the automatic document feeder 14 can convey the original T through the sheet reversing member 145 to read not only the printed side of the original T but also the opposite side to the printed side of the original T with the image reading unit 12.

Next, the positioning sensor 81 will be explained. The positioning sensor 81 detects an original T on which an image is printed. The positioning sensor 81 consists for example of a reflection type photosensor. The positioning sensor 81 pulls up an output signal when an original T is detected, and pulls down the output signal when the original T becomes no longer detected. The output signal is transmitted to the control unit 41. Namely, while the original T is passing through the positioning sensor 81, the output signal is maintained at a certain level.

Next, the image reading unit 12 will be explained. The image reading unit 12 performs an operation of reading a color image formed on an original T, i.e., a color image printed on the original T. The image reading unit 12 is provided with a one-dimensional image sensor 128. Also, in addition to the image sensor 128, the image reading unit 12 is further provided with a first platen glass 121, a second platen glass 122, a light source 123, mirrors 124, 125 and 126, an image forming optical unit 127 and an optical drive unit which is not shown in the figure.

The light source 123 irradiates an original T with light. The optical drive unit not shown in the figure moves the original T or the image sensor 128 in relation to each other in the subscanning direction. The subscanning direction in this case is the direction which is perpendicular to the main scanning direction in which are arranged a plurality of light receiving devices forming the image sensor 128.

Accordingly, an original T is conveyed by the automatic document feeder 14 and passed through an optical system of the image reading unit 12 to read an image(s) on either or both sides of the original T. Next, the incident light of the image reading operation is read by the image sensor 128. In a platen mode, the image sensor 128 outputs an image reading signal Sout which is obtained by reading an original T based on the RGB color model. This platen mode is a mode in which the optical drive unit not shown in the figure is driven to automatically read an image printed on an original T which is placed on a platen glass such as a first platen glass 121 and a second platen glass 122.

Next, the image sensor 128 will be specifically explained. The image sensor 128 includes three line color CCD imaging devices. Namely, the image sensor 128 consists of a plurality of light receiving element rows arranged in the main scanning direction. Specifically, read sensors which detect light corresponding to red (R), a green (G) and blue (B) divide picture elements in different positions in the subscanning direction perpendicular to the main scanning direction to read optical information corresponding to red, green and blue at the same time respectively. For example, when an original T is reversed by the roller 143 as a U-shaped turn in the automatic feeding mode, the image sensor 128 reads the surface of the original T and outputs an image reading signal Sout.

More specifically, the image sensor 128 photoelectrically converts an incident light, and is connected to the image processing unit 43 through the control unit 41. The image reading signal Sout which is an analog signal photoelectrically converted by the image sensor 128 is processed by performing an analog process, A/D conversion, shading compensation, an image compression process, a variable magnification process and so forth in the image processing unit 43. As a result, the image reading signal Sout becomes digital image data consisting of a red component, a green component and a blue component. The image processing unit 43 converts this digital image data, i.e., RGB code, into image signals Dy, Dm, Dc and Dk corresponding to color Y (yellow), color M (Magenta), color C (cyan) and color K (black) respectively. The image processing unit 43 transfers the converted data to LED writing units 611Y, 611M, 611C and 611K incorporated in the image forming unit 60.

Next, the image forming unit 60 will be explained in detail. The image forming apparatus 60 is an intermediate transfer type color image forming apparatus which makes use of an electrophotographic process technique. This image forming unit 60 is based on a vertical tandem system.

Specifically, the image forming unit 60 forms respective images based on the image data transferred from the image processing unit 43, i.e., signals Dy, Dm, Dc and Dk. The image forming unit 60 is provided with image forming units 601Y, 601M, 601C and 601K corresponding to the color components respectively, the intermediate transfer unit 620, and a fixing unit 630 for fixing toner images.

Next, the image forming unit 601Y will be explained. The image forming unit 601Y forms an image of color Y (yellow). The image forming unit 601Y is provided with a photoreceptor drum 613Y, a charging unit 614Y, an LED writing unit 611Y, a developing unit 612Y, and a cleaning unit 616Y.

The photoreceptor drum 613Y forms a toner image of color Y. The charging unit 614Y is arranged in the vicinity of the photoreceptor drum 613Y, and uniformly charges the surface of the photoreceptor drum 613Y with negative charge by corona discharge. The LED writing unit 611Y irradiates the photoreceptor drum 613Y with light corresponding to an image of color Y component. The developing unit 612Y forms a toner image by attaching a toner of color Y component to the surface of the photoreceptor drum 613Y to visualize the electrostatic latent image. The cleaning unit 616Y removes transfer residual toner which remains on the surface of the photoreceptor drum 613Y after a first transfer process.

Incidentally, each of the image forming units 601M, 601C and 601K has the similar constituent elements and functions as the image forming unit 601Y except for the color of images to be formed, and therefore redundant description is not repeated.

Meanwhile, the image forming units 601Y, 601M, 601C and 601K are referred to simply as the image forming unit 601 when they need not be distinguished. Also, the LED writing units 611Y, 611M, 611C and 611K are referred to simply as the LED writing unit 611. Furthermore, the developing units 612Y, 612M, 612C and 612K are referred to simply as the developing unit 612. Still further, the photoreceptor drums 613Y, 613M, 613C and 613K are referred to simply as the photoreceptor drum 613. Still further, the charging units 614Y, 614M, 614C and 614K are referred to simply as the charging unit 614. Still further, the cleaning units 616Y, 616M, 616C and 616K are referred to simply as the cleaning unit 616.

Next, the intermediate transfer unit 620 will be explained. The intermediate transfer unit 620 is provided with an intermediate transfer belt 621, transfer rollers 622Y, 622M, 622C and 622K, a transfer roller 623, a belt cleaning apparatus 624 and the like.

The intermediate transfer belt 621 is an endless belt which is wound around the plurality of support rollers in the form of a loop. At least one of the plurality of support rollers consists of a drive roller, and the others consist of non-driven rollers respectively. For example, preferably, the support roller located in the downstream side of the first transfer rollers 622K for K component in the belt running direction is preferably implemented as the drive roller in this case. When the drive roller rotates, the intermediate transfer belt 621 runs at a constant speed in the direction indicated with arrow Z.

The first transfer rollers 622Y, 622M, 622C and 622K are arranged in the inner surface side of the intermediate transfer belt 621 and opposed to the photoreceptor drums 613 in correspondence with the color components respectively. The first transfer rollers 622Y, 622M, 622C and 622K are urged against the photoreceptor drums 613Y, 613M, 613C and 613K respectively through the intermediate transfer belt 621. First transfer nip portions are thereby formed for transferring toner images from the photoreceptor drums 613Y, 613M, 613C and 613K to the intermediate transfer belt 621.

Incidentally, the first transfer rollers 622Y, 622M, 622C and 622K are referred to simply as the first transfer roller 622 when they need not be distinguished.

The second transfer roller 623 is located in the outer surface side of the intermediate transfer belt 621 and opposed to one of the plurality of support rollers. The support roller located opposite to the second transfer roller 623 is called a backup roller. A second transfer nip portion is formed by urging the second transfer roller 623 against the backup roller with the intermediate transfer belt 621 therebetween for transferring the toner images from the intermediate transfer belt 621 to a sheet P.

When the intermediate transfer belt 621 is passed through the first transfer nip portions, toner images are successively transferred to the intermediate transfer belt 621 from the photoreceptor drum 613 and superimposed on the intermediate transfer belt 621 respectively as a first transfer process. More specifically, a first transfer bias voltage is applied to the first transfer roller 622 in order to charge the rear surface (which contacts the first transfer roller 622) of the intermediate transfer belt 621 with electricity of the polarity opposite to that of toner so that the toner images are electrostatically transferred to the intermediate transfer belt 621.

The superimposed toner image on the intermediate transfer belt 621 is then transferred to a sheet P which is passed through the second transfer nip portion as a second transfer process. More specifically, a second transfer bias voltage is applied to the second transfer roller 623 in order to charge the back side of the sheet P, i.e. the side which contacts the second transfer roller 623, with electricity of the polarity opposite to that of toner so that the superimposed toner image is electrostatically transferred to the sheet P. The sheet P with the transferred toner image is conveyed to the fixing unit 630.

The belt cleaning unit 624 includes a belt cleaning blade, which is in slidable contact with the surface of the intermediate transfer belt 621, and so forth. The belt cleaning unit 624 removes toner which remains on the surface of the intermediate transfer belt 621 after the second transfer process.

Meanwhile, in the intermediate transfer unit 620, the function of the second transfer roller 623 can be implemented by an alternative structure, i.e., a so-called belt-type second transfer unit, consisting of a second transfer belt (not shown in the figure) which is wound around a plurality of support rollers including the second transfer roller 623 in the form of a loop.

Next, the fixing unit 630 will be explained. The fixing unit 630 is provided with a heat roller 631, a pressure roller 632, a heating unit 633 and a temperature detection unit 83 to fix a toner image transferred by the image forming unit 60 to a sheet P.

Specifically, the heating unit 633 is located in the heat roller 631 to intermittently heat the heat roller 631. The pressure roller 632 is located opposite to the heat roller 631 to apply a pressure to the heat roller 631. The temperature detection unit 83 is located around the heat roller 631 to detect the temperature of the heat roller 631. The sampling frequency of the temperature detection unit 83 is for example 100 ms.

The fixing unit 630 heats the heat roller 631 with the heating unit 633 in accordance with the detection result of the temperature detection unit 83 which detects the temperature of the heat roller 631. The fixing unit 630 forms a fixing nip between the heat roller 631 and the pressure roller 632 which are urged against each other.

The fixing unit 630 fixes the transferred image to a sheet P under the pressure applied by the pressure roller 632 and the heat applied through the heat roller 631. An image is printed on the sheet P by the fixing process of the fixing unit 630. After printing the image, the sheet P is discharged outwards by discharging rollers 304, and for example conveyed to the image reading apparatus 7. Alternatively, the sheet P with the image printed thereon may not be conveyed to the image reading apparatus 7, but stacked on the catch tray 305.

Next, the paper feed unit 20 will be explained. The paper feed unit 20 is provided with paper feed cassettes 200, feed rollers 201 and the like. The paper feed cassette 200 accommodates sheets P. The feed rollers 201 take in the sheets P accommodated in the paper feed cassette 200 and feed out the sheets P to the conveyance unit 30.

Next, the conveyance unit 30 will be explained. The conveyance unit 30 includes a conveying route 300 along which sheets P are conveyed. The conveying route 300 is provided with paper feed rollers 302A, conveyance rollers 302B, 302C and 302D, a paper stop roller 303 and so forth.

The conveying route 300 conveys a sheet P fed from the paper feed unit 20 to the image forming unit 60. Meanwhile, in the case where an image is to be formed also on the back side of a sheet P, the sheet P is conveyed through a paper circulation route 307A, a sheet reversing route 307B and a refeeding conveying route 307C in this order by a branch section 306 after forming an image on the front side of the sheet P.

Next, the control system of the image forming apparatus 5 will be explained. The image forming apparatus 5 performs various types of processing through the control unit 41. For example, the image reading signal Sout which is output from the image reading unit 12 is transmitted to the image processing unit 43 or an image memory (not shown in the figure) through the control unit 41. The image memory consists, for example, of a hard disk.

Specifically, the control unit 41 consists mainly of a CPU, a ROM, a RAM, and an I/O interface. The CPU of the control unit 41 reads various programs from the ROM or a storage unit which is not shown in the figure in accordance with required processes, loads the programs on the RAM, and executes the loaded programs to cooperate with the control unit 41 and control the operation of each element of the image forming apparatus 5.

In other words, the control unit 41 is responsible for controlling the operation of the image forming apparatus 5 and implemented with a microcomputer which consists mainly of the CPU, the ROM, the RAM, and the I/O interface which are not shown in the figure. A predetermined control program is run by the control unit 41 to implement various functions.

Figure 3:
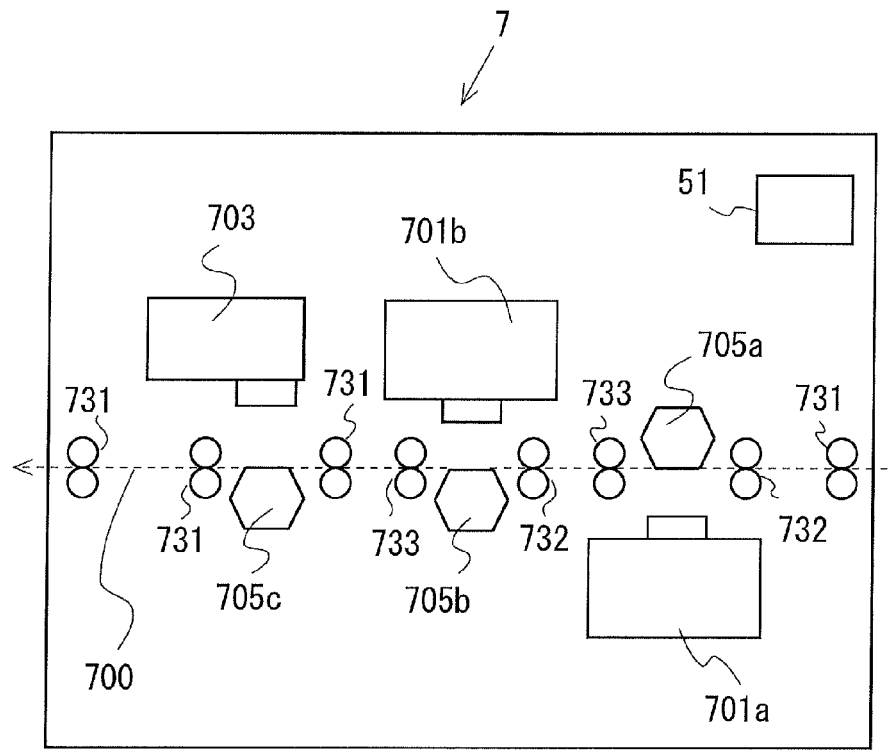
FIG. 3 is a view for showing an example of the configuration of an image reading apparatus 7 in accordance with the embodiment 1 of the present invention.

Next, the image reading apparatus 7 will be specifically explained. FIG. 3 is a view for showing an example of the configuration of the image reading apparatus 7 in accordance with the embodiment 1 of the present invention. The image reading apparatus 7 is arranged in the downstream side of the image forming apparatus 5 and responsible for reading an image printed on one or both side of a sheet P. The image reading apparatus 7 obtains correction amounts of an image printed on the sheet P based on the reading results such as the color, position and magnification factor of the image, and feeds back the correction amounts of the image to the image forming apparatus 5.

The image reading apparatus 7 is provided with a control unit 51, a scanner 701*a*, a scanner 701*b*, a spectrophotometer 703, calibration members 705*a* to 705*c*, a conveyance roller 731, a first conveyance unit 732, a second conveyance unit 733 and a paper path 700. The conveying route 700 is a route through which is passed a sheet P supplied from the image forming apparatus 5, and serves to convey the sheet P by driving the conveyance roller 731. Incidentally, while the following explanation is directed to an example in which a sheet P is conveyed through the conveying route 700 as an example of a medium, the example is not limited to a sheet P but can be a medium on which an image is formed.

For example, receiving a sheet P supplied from the image forming apparatus 5, the image reading apparatus 7 has the scanner 701*a*, the scanner 701*b* or the spectrophotometer 703 detect the image formed on the sheet P. The result of detecting the image is output to the control unit 51 of the image reading apparatus 7.

The control unit 51 is responsible for controlling the image reading apparatus 7 and can be implemented with a microcomputer consisting mainly of a CPU, a ROM, a RAM, and an I/O interface. A predetermined control program is run by the control unit 51 to implement various functions. Incidentally, the control unit 51 performs various processes based on the result of detecting the image, and transmits the results of the processes to the control unit 41 of the image forming apparatus 5.

The scanner 701*a* and the scanner 701*b* are arranged to face a sheet P which is passed through the conveying route 700 and read an image printed on the sheet P. The scanner 701*a* is responsible for reading the back side of a sheet P, and the reading result is used, for example, to check misalignment between images printed on the front and back sides of the sheet P, and the existence of an extraordinary image or the like. On the other hand, the scanner 701*b* is responsible for reading the front side of a sheet P, i.e., performing reading operation of an image printed on the sheet P such as patches which is not shown in the figure. Incidentally, the scanner 701*a* and the scanner 701*b* are referred to simply as the scanner 701 when they need not be distinguished.

Incidentally, the image reading apparatus 7 is configured to operate as either an in-line system or an offline system.

The in-line system provides a configuration in which the image reading apparatus 7 is directly fed with a sheet P which is supplied from the image forming apparatus 5 and on which an image is formed. On the other hand, the offline system provides a configuration in which the image reading apparatus 7 is not directly fed with a sheet P which is supplied from the image forming apparatus 5 and on which an image is formed, but the image forming apparatus 5 and the image reading apparatus 7 are designed independently from each other. The following explanation is based on the assumption that an in-line system is used. However, an offline system can be used instead.

The spectrophotometer 703 is arranged to face a sheet P passing along the conveying route 700 in the downstream side of the scanner 701. For example, the spectrophotometer 703 guarantees the absolute value of the color of an image formed on a sheet P by spectrophotometrically measuring patches of images printed on the sheet P.

Specifically, the spectrophotometer 703 radiates visible light to the patches from a visible light source which is not shown in the figure, acquires an optical spectrum of the reflected visible light, and derives the color tones of the patches by performing operations in a predetermined color model based on the acquired optical spectrum.

The spectrophotometric result of the patches is generated as numeric data, i.e., spectrophotometric values, represented in a predetermined color model such as Lab color space or XYZ color space, and output to the control unit 51 or the control unit 41.

Incidentally, the spectrophotometric range, i.e., the viewing angle of the spectrophotometer 703 is narrower than the reading area of the scanner 701, and set to be narrower than the width of the patches in the sheet width direction. Specifically, a lens section which receives the light reflected from the patches has, for example, a diameter of about 4 mm.

Since spectrophotometric measurement is performed within a limited range of viewing angle in this manner, the spectrophotometer 703 can generate the color information with higher accuracy than the scanner 701.

Incidentally, the control unit 51 corrects the color information of patches read by the scanner 701 based on the spectrophotometric values of the patches spectrophotometrically measured by the spectrophotometer 703. More specifically, the control unit 51 associates the color information of the patches spectrophotometrically measured by the spectrophotometer 703 with the color information of the patches read by the scanner 701. Since the color information of the patches spectrophotometrically measured by the spectrophotometer 703 and the color information of the patches read by the scanner 701 are associated with each other, the spectrophotometrically measurement result of the spectrophotometer 703 can be reflected in the reading result of the scanner 701 to obtain an accurate correction amount.

The image processing unit 43 optimizes images to be formed by the image forming unit 60 based on the correction amount calculated by the control unit 51. The process of optimizing images to be performed by the image processing unit 43 includes positional adjustment of images to be printed on the front and back sides of a sheet P, adjustment of densities, adjustment of color tones and so forth.

Namely, the image processing unit 43 corrects the color, position or magnification factor of an image formed on a sheet P in accordance with the reading result of the sheet P of the image reading apparatus 7. Specifically, the image processing unit 43 corrects the image formed on the sheet P based on the corrected color information. The image processing unit 43 outputs a command to the image forming unit 60 based on the correction result for forming an image on the sheet P.

Figure 4:
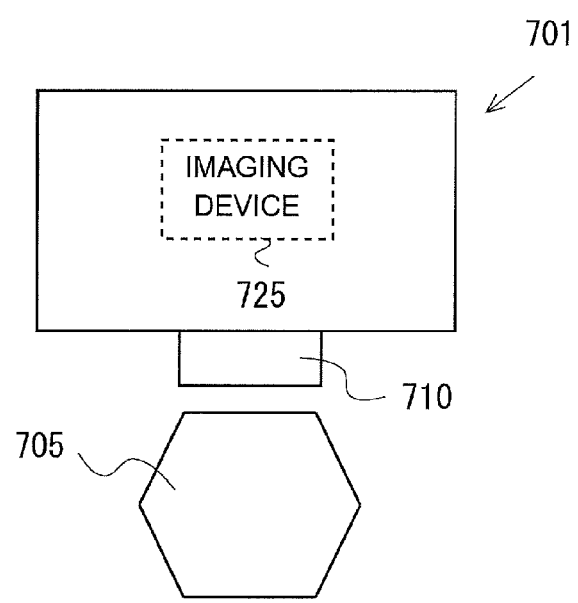
FIG. 4 is a view for showing an example of the configuration of a scanner 701 in accordance with the embodiment 1 of the present invention.

Next, the scanner 701 will be specifically explained. FIG. 4 is a view for showing an example of the configuration of the scanner 701 in accordance with the embodiment 1 of the present invention. The scanner 701 is provided in the upstream side of the spectrophotometer 703, and consists of an image reading unit 710 for irradiating a sheet P which is passed through a reading position, and a line image sensor consisting of a plurality of imaging devices 725 which are linearly arranged in the sheet width direction to photoelectrically convert light reflected from the sheet P in correspondence with picture elements respectively. The reading area of the scanner 701 is determined to cover the maximum width of sheets P which can be supplied from the image forming apparatus 5. The scanner 701 reads the image formed on a sheet P by repeating operation of reading image data from one line as a two-dimensional image along the sheet width direction in synchronization with the operation of conveying the sheet P which is passed through the reading position. The image, which is read, is used as read image data.

The imaging device 725 is implemented with CCDs (Charge Coupled Device). The CCDs serve as an optical sensor which reads an image on a sheet P in a reading position, and arranged in a line to be capable of reading the entire width of the sheet P as a color line sensor.

When performing a reading operation, the scanner 701 has the imaging device 725 and a point light source 721 to be described below, cooperate with each other.

Namely, the scanner 701 is provided with the line image sensor for reading a sheet P along the width direction of the sheet P, and capable of acquiring an image of the whole surface of a sheet P by reading each line corresponding to the lateral width of the sheet P in the passing direction of the sheet P.

Incidentally, the calibration member 705 is arranged to face the scanner 701, and reflect irradiation light radiated to a sheet P when reading an image.

Figure 5:
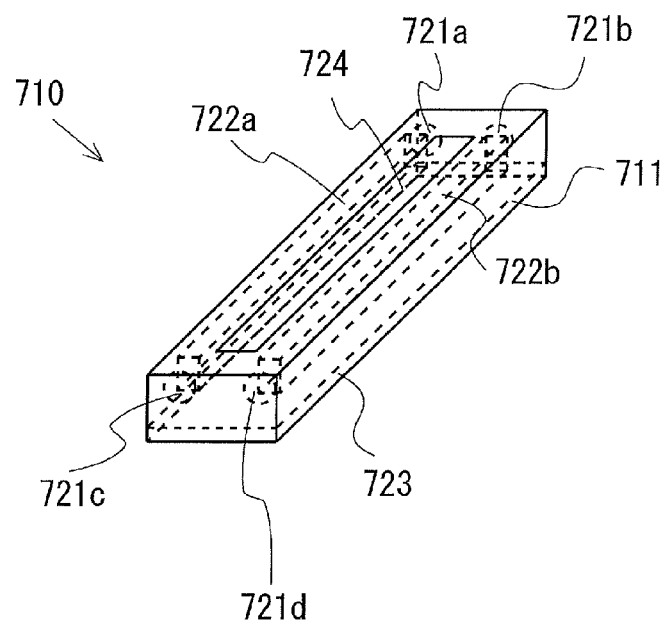
FIG. 5 is a view for showing an example of the configuration of an image reading unit 710 in accordance with the embodiment 1 of the present invention.

Next, the image reading unit 710 will be specifically explained. FIG. 5 is a view for showing an example of the configuration of the image reading unit 710 in accordance with the embodiment 1 of the present invention. As illustrated in FIG. 5, the image reading unit 710 consists of point light sources 721a to 721d, light guide members 722a and 722b and a glass 723. The point light sources 721a to 721d, the light guide members 722a and 722b and the glass 723 are housed in a housing 711. The housing 711 is provided with an opening formed along the longitudinal direction in the center of the housing 711.

The point light sources 721a to 721d irradiate a medium with irradiation light. The light guide members 722a and 722b guide light which includes reflected light originating from the irradiation light of the point light sources 721a to 721d. The glass 723 is provided on the light guide members 722a and 722b and arranged opposite to the calibration member 705. Although not shown in the figure, there is a light reception optical system between the imaging device 725 and the image reading unit 710 in order to guide light from the image reading unit 710 to the imaging device 725 through the light reception optical system. The imaging device 725 thereby images an image formed on a sheet P with light which is guided by the light guide members 722a and 722b through the glass 723.

Incidentally, the point light sources 721a to 721d are referred to simply as the point light source 721 when they need not be distinguished. Also, the light guide members 722a and 722b are referred to simply as the light guide member 722 when they need not be distinguished.

Figure 6:
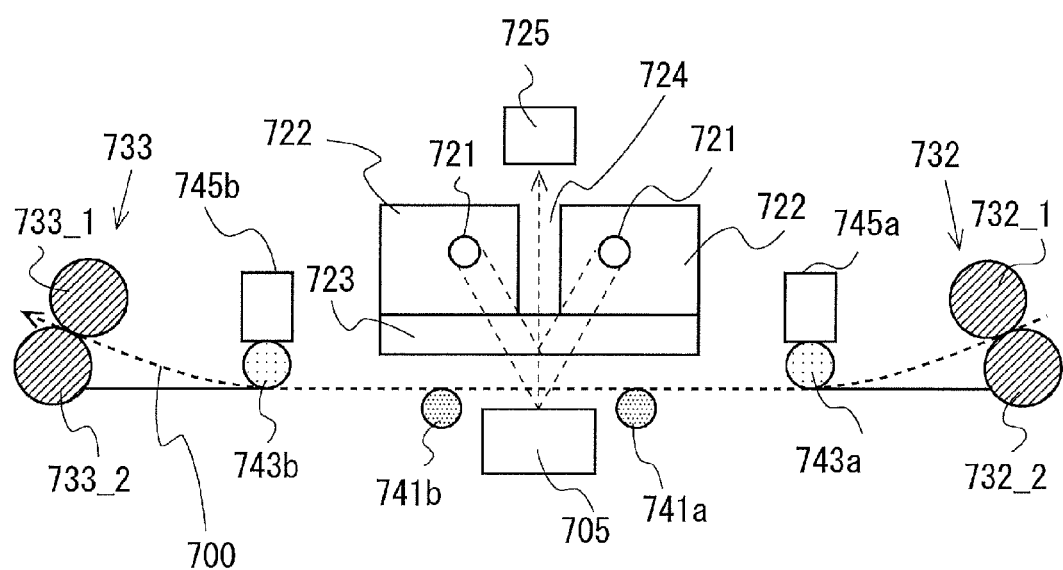
FIG. 6 is a schematic diagram for showing an example of a conveying route 700 for a medium in accordance with the embodiment 1 of the present invention.

Next, the conveying route 700 will be specifically explained. FIG. 6 is a schematic diagram for showing an example of the conveying route 700 for a medium in accordance with the embodiment 1 of the present invention. As illustrated in FIG. 6, a first conveyance unit 732, a second roller 743a, a first roller 741a, a first roller 741b, a second roller 743b, and a second conveyance unit 733 are arranged along the conveying route 700.

Incidentally, the first rollers 741a and 741b are referred to simply as the first roller 741 when they need not be distinguished. Also, the second rollers 743a and 743b are referred to simply as the second roller 743 when they need not be distinguished.

The arrangement position of the first roller 741 is fixed to guide the conveying direction of a sheet P passing between the scanner 701 and the calibration member 705. The arrangement position of the second roller 743 is variable in accordance with the stiffness of the sheet P to guide the conveying direction of a sheet P passing between the scanner 701 and the calibration member 705. The arrangement position of the second roller 743 varies only within a range in which the reading performance of the scanner 701 is guaranteed while pressing the sheet P.

Specifically describing, the first roller 741 is located in the upstream side and the downstream side of the calibration member 705 respectively. On the other hand, the second roller 743 is located in the upstream side and the downstream side of the light guide member 722 respectively.

The first conveyance unit 732 is located in the upstream side of the first roller 741 and the second roller 743 and arranged inclined toward the scanner 701 to convey a sheet P. The first conveyance unit 732 consists of a conveyance roller 732_1 and a conveyance roller 732_2 such that one of these rollers is a driving roller and the other is a follower roller.

The second conveyance unit 733 is located in the downstream side of the first roller 741 and the second roller 743 and arranged inclined toward the scanner 701 to convey a sheet P. The second conveyance unit 733 consists of a conveyance roller 733_1 and a conveyance roller 733_2 such that one of these rollers is a driving roller and the other is a follower roller.

Incidentally, the conveying speed of the second conveyance unit 733 for conveying a sheet P is preferably set faster than the conveying speed of the first conveyance unit 732 for conveying a sheet P.

Also, as illustrated in FIG. 6, the second roller 743a is provided with a loading unit 745a. The loading unit 745a applies a load to the second roller 743a for pressing a sheet P. On the other hand, the second roller 743b is provided with a loading unit 745b. The loading unit 745b has a similar function and a configuration as the loading unit 745a, and therefore explanation is not repeated. Incidentally, the loading units 745a and 745b are referred to simply as the loading unit 745a when they need not be distinguished.

Figure 7:
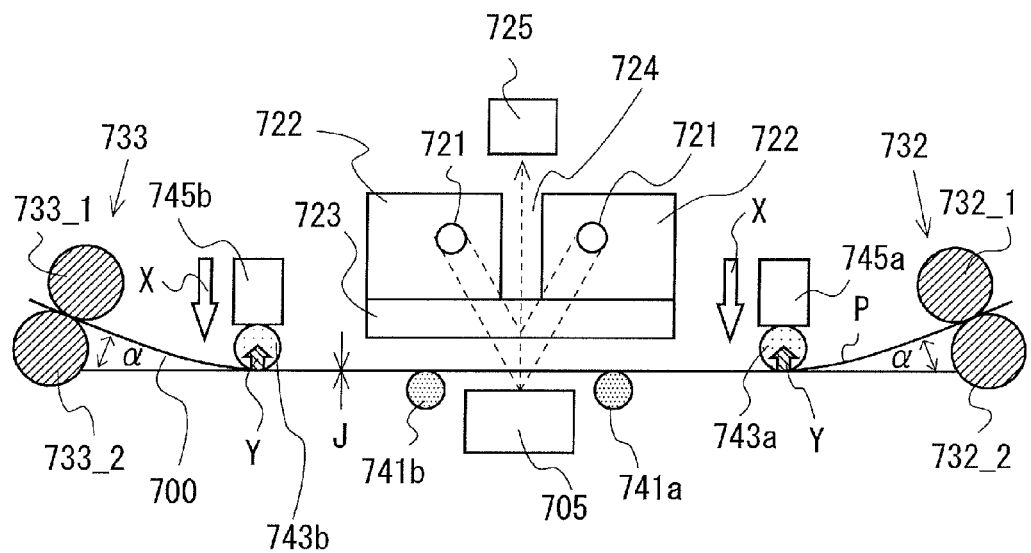
FIG. 7 is a schematic diagram for showing an example of a reaction applied to second rollers 743a and 743b from a medium having a small stiffness which is conveyed in accordance with the embodiment 1 of the present invention.

Next, explanation is directed to an example in which a sheet P is conveyed through the conveying route 700 as a medium. FIG. 7 is a schematic diagram for showing an example of a reaction Y applied to the second rollers 743a and 743b from a medium having a small stiffness which is conveyed in accordance with the embodiment 1 of the present invention. As illustrated in FIG. 7, if the stiffness of a sheet P is small and the thickness of the sheet P is small, the arrangement position of the second roller 743 is maintained under the load applied to the second roller 743 from the loading unit 745. In this case, the sheet P is a thin paper sheet having, for example, a stiffness of 0.6 and a paper density of 42 g/m². Incidentally, a gap J in the following explanation is meant to be the distance between the tangential line connecting the apices of the first rollers 741 and the tangential line connecting the apices of the second rollers 743.

In this case, since the load force X is greater than the reaction Y as illustrated in FIG. 7, the gap J is kept narrow as it is to restrict the variation in the height of the sheet P by the second roller 743. The second roller 743 which is located in the scanner 701 side is thereby not moved by the stiffness of the thin paper sheet. Accordingly, the height variation of a sheet P in the reading position of the scanner 701 is controlled by the positional relationship between the second rollers 743 and the first rollers 741.

Incidentally, the first conveyance unit 732 and the second conveyance unit 733 are inclined, for example, at an angle α of 10 degrees toward the scanner 701.

Figure 8:
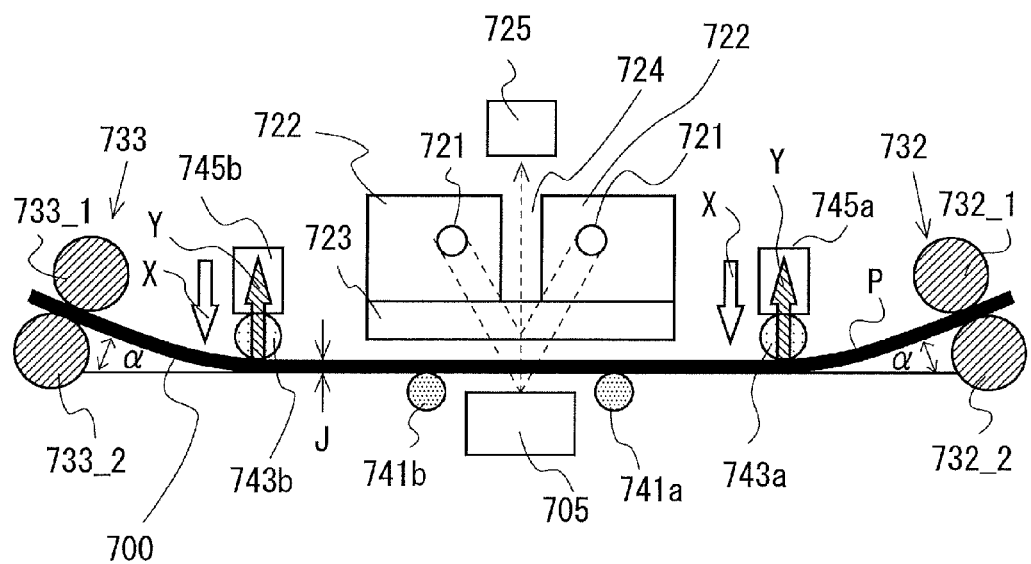
FIG. 8 is a schematic diagram for showing an example of a reaction applied to the second rollers 743a and 743b from a medium having a large stiffness which is conveyed in accordance with the embodiment 1 of the present invention.

FIG. 8 is a schematic diagram for showing an example of a reaction Y applied to the second rollers 743*a* and 743*b* from a medium having a large stiffness which is conveyed in accordance with the embodiment 1 of the present invention. As illustrated in FIG. 8, if the stiffness of a sheet P is large and the thickness of the sheet P is large, the second roller 743 is retracted in the direction opposite to the gravitational direction by its stiffness or paper thickness. In this case, the sheet P is a thick paper sheet having, for example, a stiffness of 1024 and a paper density of 350 g/m².

In this case, since the reaction Y is greater than the load force X as illustrated in FIG. 8, the arrangement position of the second roller 743 is moved by the stiffness of the sheet P to increase the gap J. By this configuration, since the second roller 743 located in the scanner 701 side is retracted in accordance with the stiffness of the thick paper sheet, it is possible to restrict the height variation of the sheet P in the reading position of the scanner 701 while applying a certain load.

Incidentally, the loading unit 745 restricts the gap J within 0 mm to 0.2 mm by applying the load force X, for example 12.7N, to the second roller 743. The angle α of the first conveyance unit 732 and second conveyance unit 733 is, for example, an inclination of 10 degrees toward the scanner 701.

Figure 9:
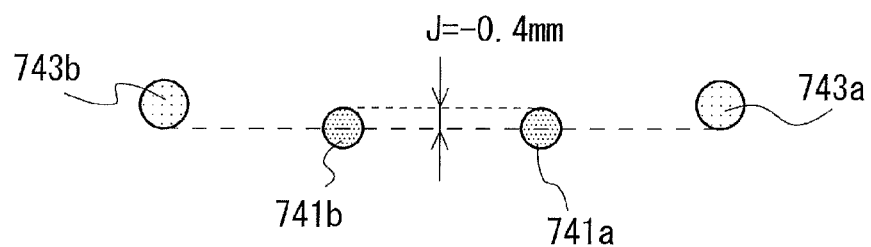
FIG. 9 is a schematic diagram for showing an example of the positional relationship between first rollers 741a and 741b and the second rollers 743a and 743b of the embodiment 1 of the present invention such that a gap therebetween takes in a minus value in the direction perpendicular to the conveying route 700.

Next is an explanation of the variation of the gap J in correspondence with the positional relationship between the first roller 741 and the second roller 743. FIG. 9 is a schematic diagram for showing an example of the positional relationship between the first rollers 741*a* and 741*b* and the second rollers 743*a* and 743*b* of the embodiment 1 of the present invention such that the gap J takes in a minus value in the direction perpendicular to the conveying route 700.

As illustrated in FIG. 9, the gap J is −0.4 mm in the positional relationship between the tangential line connecting the apices of the first rollers 741 and the tangential line connecting the apices of the second rollers 743. In this case, when the thickness of a sheet P is no larger than 0.4 mm, the gap J is not greater than 0.

Figure 10:
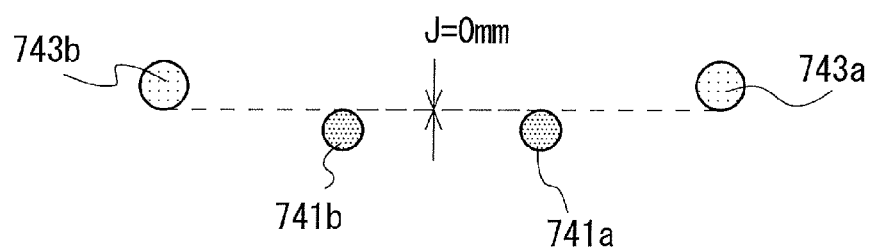
FIG. 10 is a schematic diagram for showing an example of the positional relationship between the first rollers 741a and 741b and the second rollers 743a and 743b of the embodiment 1 of the present invention such that the gap is zero in the direction perpendicular to the conveying route 700.

FIG. 10 is a schematic diagram for showing an example of the positional relationship between the first rollers 741*a* and 741*b* and the second rollers 743*a* and 743*b* of the embodiment 1 of the present invention such that the gap J is zero in the direction perpendicular to the conveying route 700.

As illustrated in FIG. 10, the gap J is 0 mm in the positional relationship between the tangential line connecting the apices of the first rollers 741 and the tangential line connecting the apices of the second rollers 743. In this case, the gap J can be greater than 0 in accordance with the thickness of a sheet P.

Figure 11:
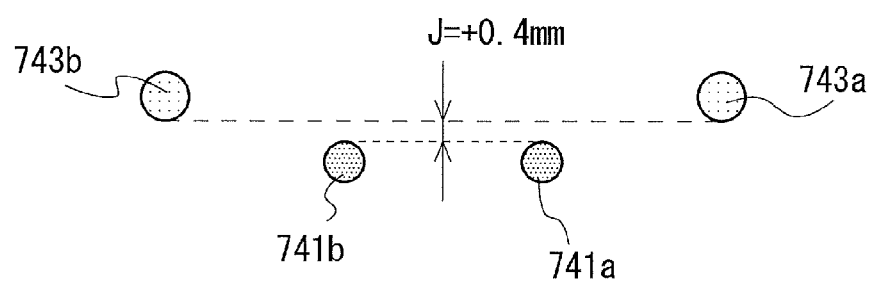
FIG. 11 is a schematic diagram for showing an example of the positional relationship between the first rollers 741a and 741b and the second rollers 743a and 743b of the embodiment 1 of the present invention such that the gap takes in a plus value in the direction perpendicular to the conveying route 700.

FIG. 11 is a schematic diagram for showing an example of the positional relationship between the first rollers 741*a* and 741*b* and the second rollers 743*a* and 743*b* of the embodiment 1 of the present invention such that the gap J takes in a plus value in the direction perpendicular to the conveying route 700.

As illustrated in FIG. 11, the gap J is +0.4 mm in the positional relationship between the tangential line connecting the apices of the first rollers 741 and the tangential line connecting the apices of the second rollers 743. In this case, when the thickness of a sheet P is larger than 0.4 mm, the gap J is greater than 0.4 mm.

Figure 12:
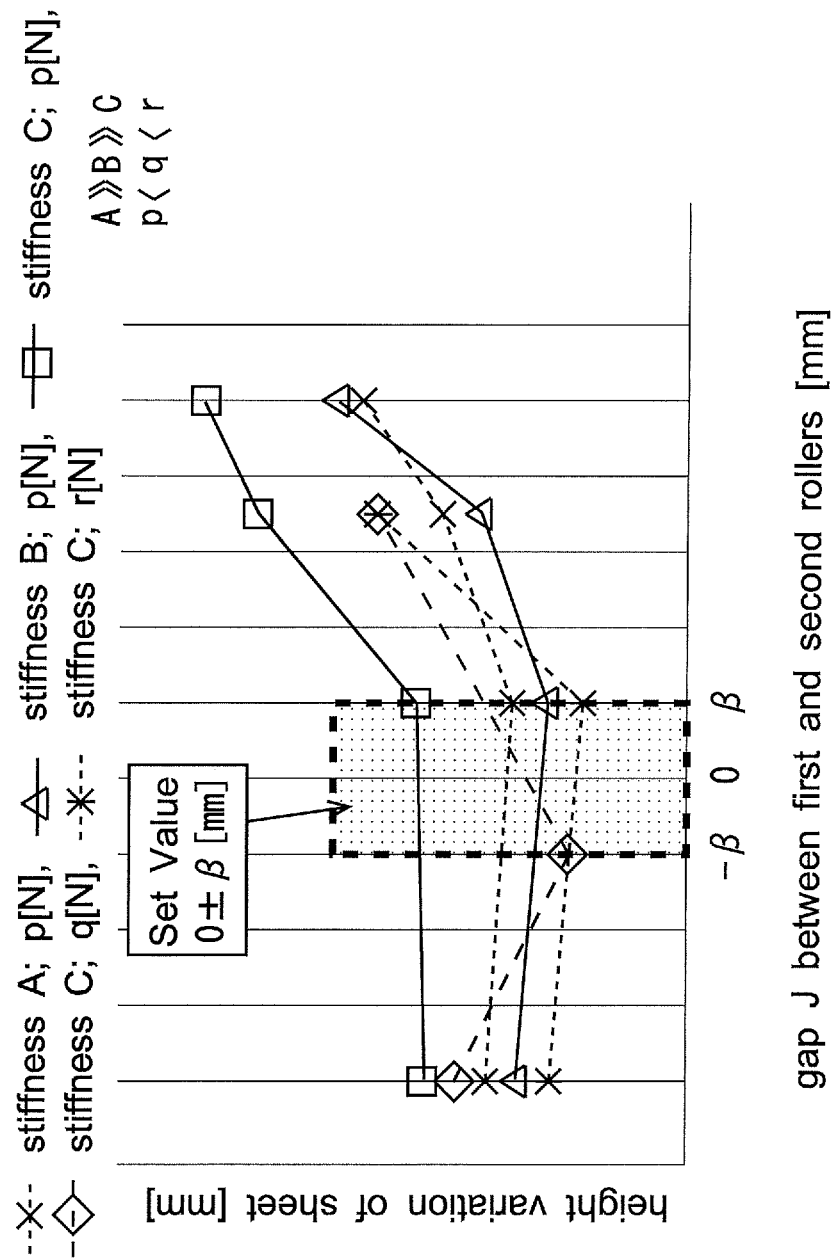
FIG. 12 is a diagram for showing an example of the correlation between the height variation of a sheet and the gap in the direction perpendicular to the conveying route 700 between the first rollers 741a and 741b and the second rollers 743a and 743b of the embodiment 1 of the present invention.

Next is an explanation of the correlation between the gap J and the height variation of a sheet P. FIG. 12 is a diagram for showing an example of the correlation between the height variation of a sheet P and the gap J in the direction perpendicular to the conveying route 700 between the first rollers 741*a* and 741*b* and the second rollers 743*a* and 743*b* of the embodiment 1 of the present invention.

As illustrated in FIG. 12, the height variation of a sheet P increases as the gap J increases. Also, the height variation of a sheet P decreases as the force of pressing a sheet P increases. However, as the gap J decreases in the minus side, the occurrence rate of sheet conveyance troubles may increase. The gap J is preferably set in a range of ±β mm from a set value. For example, β is 0.2 mm.

Next, a prior art configuration will be explained and compared with the embodiment 1 of the present invention. Incidentally, the first roller 741 and the second roller 743 are referred to simply as the guide member 740. Also, a lower guide 1741 and an upper guide 1743 are referred to simply as the guide member 1740.

Figure 19:
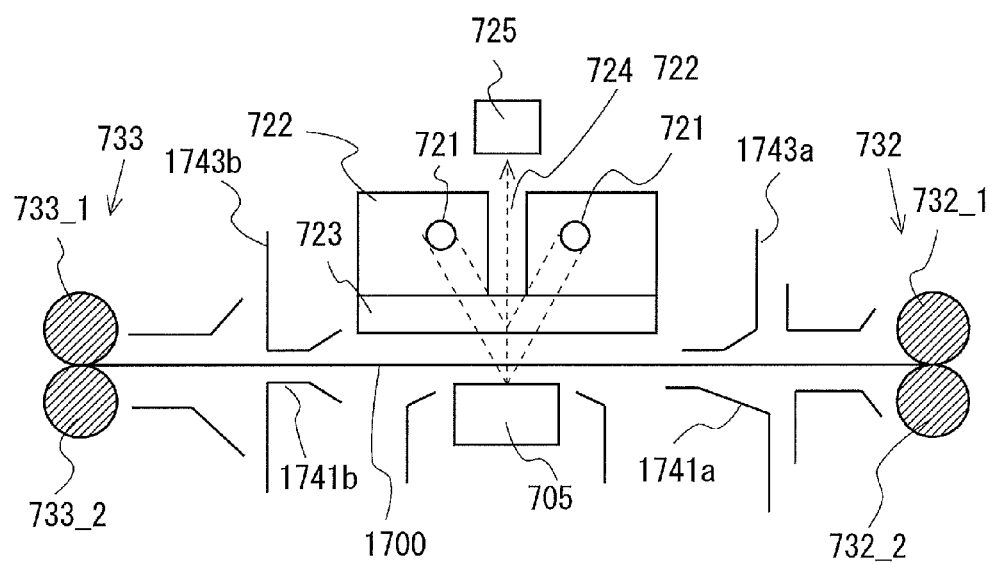
FIG. 19 is a schematic diagram for showing an example of a conveying route 1700 for a medium in accordance with a prior art configuration.
Figure 20:
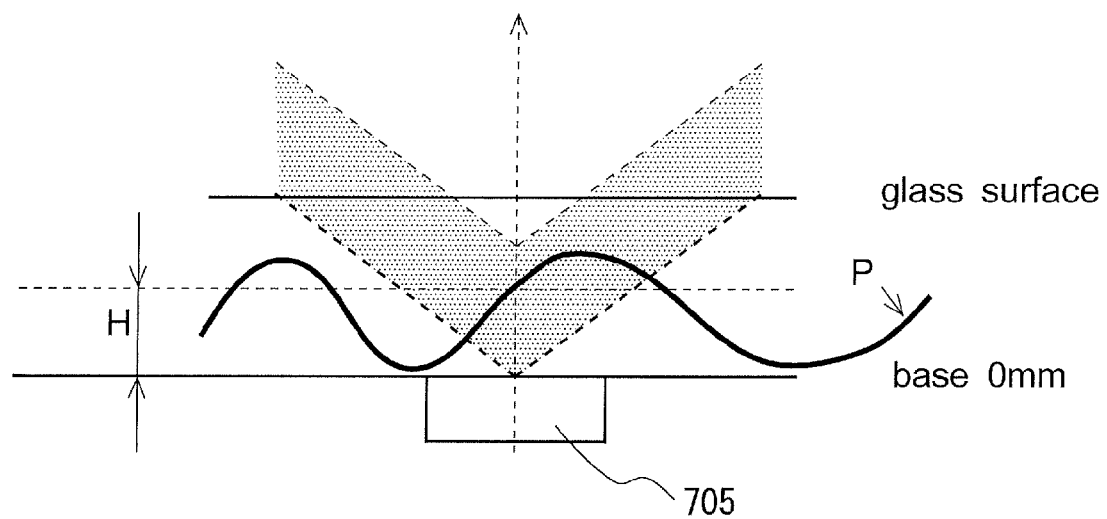
FIG. 20 is a schematic diagram for showing the path of light emitted from the point light source 721 in accordance with the prior art configuration.

FIG. 19 is a schematic diagram for showing an example of a conveying route 1700 for a medium in accordance with the prior art configuration. FIG. 20 is a schematic diagram for showing the path of light emitted from the point light source 721 in accordance with the prior art configuration. As illustrated in FIG. 19, a first conveyance unit 732, a lower guide 1741*a*, an upper guide 1743*a*, a lower guide 1741*b*, an upper guide 1743*b* and a second conveyance unit 733 are arranged along the conveying route 1700.

The first conveyance unit 732 and the second conveyance unit 733 are arranged in order not to incline toward either the scanner 701 or the calibration member 705. The lower guide 1741*a* and the upper guide 1743*a* are arranged opposite to each other. The lower guide 1741*a* and the upper guide 1743*a* have guide portions in approximately tapered fashions from the upstream side to the downstream side. The lower guide 1741*b* has a similar configuration as the lower guide 1741*a*, and the upper guide 1743*b* has a similar configuration as the upper guide 1743*a* so that no redundant description is repeated. Incidentally, the lower guides 1741*a* and 1741*b* are referred to simply as the lower guide 1741 when they need not be distinguished. Also, the upper guides 1743*a* and 1743*b* are referred to simply as the upper guide 1743 when they need not be distinguished.

When a sheet P is conveyed through the conveying route 1700 shown in FIG. 19, the sheet P may flap as illustrated in FIG. 20. For example, as illustrated in FIG. 20, the sheet P may flap beyond a height H to which the reading performance of the scanner is guaranteed.

Figure 13:
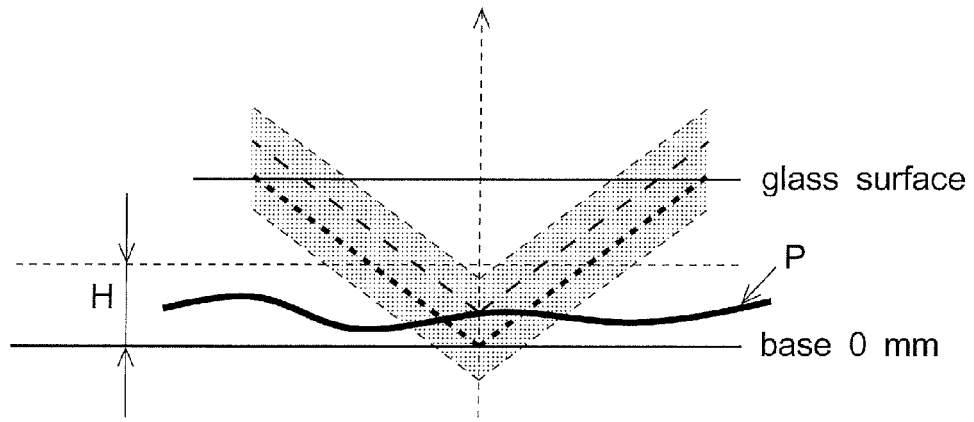
FIG. 13 is a schematic diagram for showing an example of the path of light emitted from a point light source 721 in accordance with the embodiment 1 of the present invention.
Figure 14:
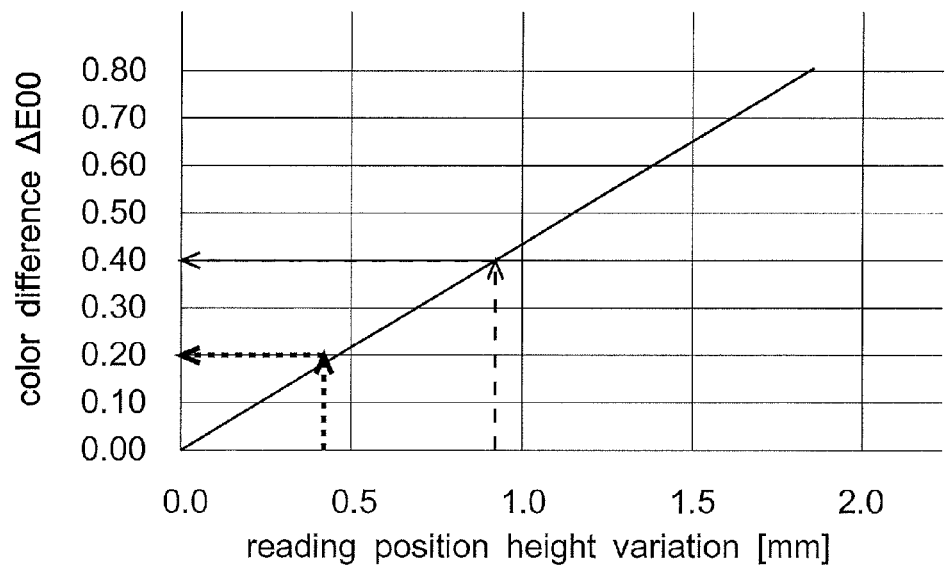
FIG. 14 is a diagram for showing an example of the correlation between the reading position height variation and the color difference based on the read value which is read by the scanner 701.

The differences between the prior art configuration and the embodiment 1 of the present invention will be explained. FIG. 13 is a schematic diagram for showing an example of the path of light emitted from the point light source 721 in accordance with the embodiment 1 of the present invention. FIG. 14 is a diagram for showing an example of the correlation between the reading position height variation and the color difference ΔE00 based on the read value which is read by the scanner 701.

As illustrated in FIG. 13, in the case of the guide member 1740 according to the prior art configuration, a sheet P is located within the range of the height H to which the reading performance of the scanner is guaranteed, but the reading position of the scanner 701 is not the base position of 0 mm. On the other hand, in the case of the guide member 740 according to the embodiment 1 of the present invention, a sheet P is located within the range of the height H to which the reading performance of the scanner is guaranteed, and the reading position of the scanner 701 is the base position of 0 mm.

These cases are compared based on the example of the path of light as illustrated in FIG. 13. The paper density of the sheet P is 128 g/m$^2$. As illustrated in FIG. 14, when the height variation is 0.9 mm in the case of the guide member 1740 according to the prior art configuration, the color difference ΔE00 is about 0.40. On the other hand, when the height variation is 0.4 mm in the case of the guide member 740 according to the embodiment 1 of the present invention, the color difference ΔE00 is about 0.20. In this manner, as the reading position of the scanner 701 varies, the light quantity entering the imaging device 725 varies, and thereby the photoelectrically converted value thereof also varies. The color difference ΔE00 calculated based on the photoelectrically converted value thereby also varies. Since the color change value becomes small as the color difference ΔE00 decreases, the guide member 740 is preferred with which the color difference ΔE00 becomes small.

Figure 15:
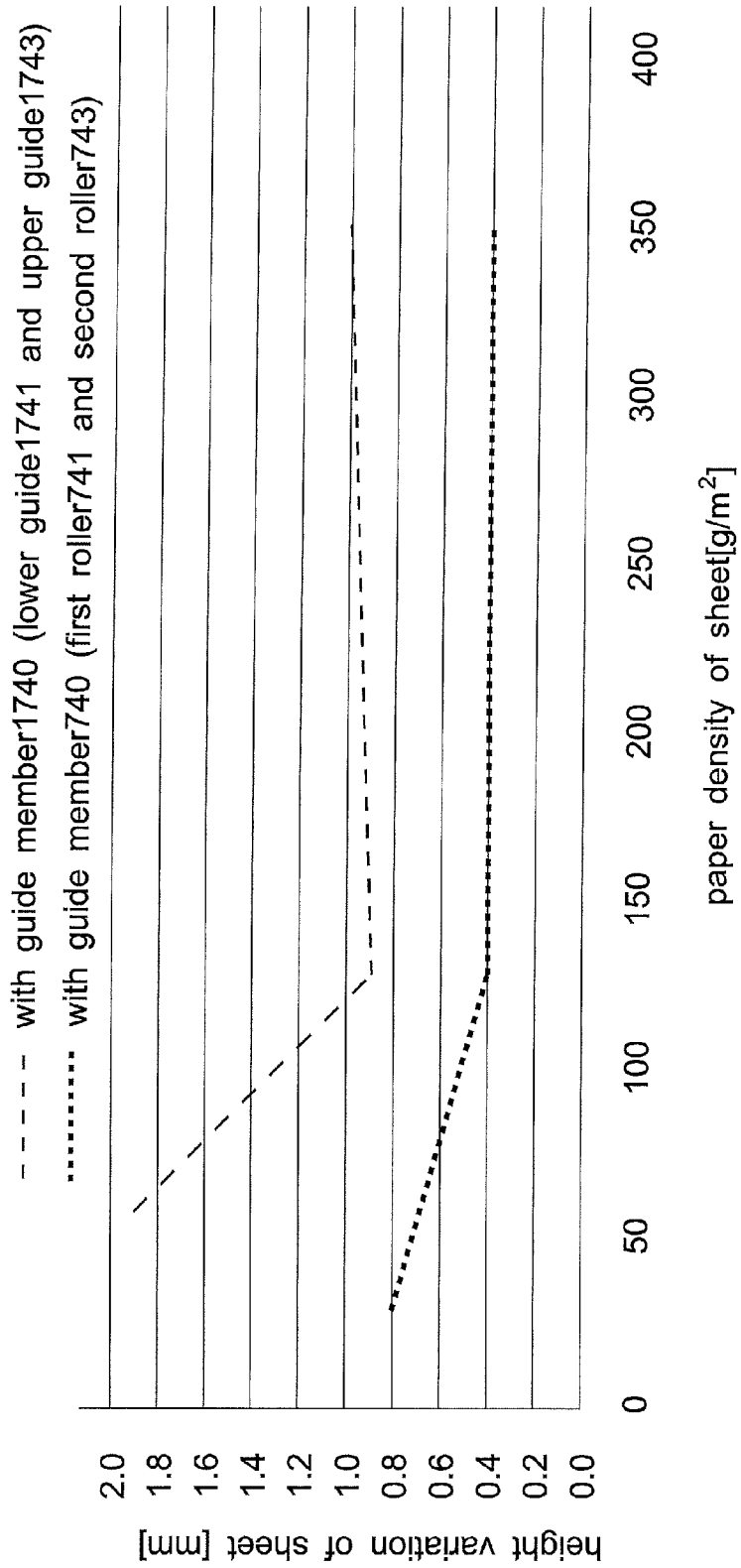
FIG. 15 is a diagram for showing an example of the correlation between the height variation of a sheet and the paper density of the sheet in accordance with the embodiment 1 of the present invention.

Meanwhile, as the paper density of a sheet P decreases, the flapping amount of the sheet P tends to be greater. Then, the prior art configuration and the embodiment 1 of the present invention will be compared in the case where the paper density of a sheet P is small. FIG. 15 is a diagram for showing an example of the correlation between the height variation of a sheet P and the paper density of the sheet P in accordance with the embodiment 1 of the present invention.

As shown in FIG. 15, compared with the guide member 1740 of the prior art configuration, the guide member 740 of the embodiment 1 of the present invention can more effectively inhibit the sheet height variation. From this fact, with the guide member 740, it is possible to inhibit the flapping of a sheet P such as the sheet height variation.

The positional relationship among a medium, the scanner 701 and the calibration member 705 is stabilized, while passing the medium between the scanner 701 and the calibration member 705, by pressing and guiding the medium with the second roller 743. Accordingly, even if the conveying speed of the medium increases, the medium does not flap when passing between the scanner 7701 and the calibration member 705. Particularly, even if a medium has a small stiffness such as a thin paper sheet and the conveying speed of the medium increases, since the second roller 743 presses and guides the medium, the medium does not flap when passing between the scanner 701 and the calibration member 705. As a result, it is possible to inhibit a medium from flapping when passing between the scanner 701 and the calibration member 705.

Accordingly, since the illuminance of the point light source 721 is stabilized in the reading position of the scanner 701, the read value of an image formed on a medium is stabilized and the color difference ΔE00 does not greatly fluctuate. The color read value of the image formed on the medium can thereby be recognized as a true value. It is therefore possible to correctly read the image formed on the medium.

Furthermore, the arrangement position of the second roller 743 varies within a range in which the reading performance of the scanner 701 is guaranteed, and thereby a medium can be conveyed without jamming. Particularly, even if a medium has a large stiffness such as a thick paper sheet, the arrangement position of the second roller 743 varies within the range in which the reading performance of the scanner 701 is guaranteed. Accordingly, even when the second roller 743 is pressing a medium, the second roller 743 can move by the thickness of the medium within the range in which the reading performance of the scanner 701 is guaranteed. The medium can thereby be conveyed without jamming in the image reading apparatus 7.

In other words, since the arrangement position of the second roller 743 of the image reading apparatus 7 shifts within the range in which the reading performance of the scanner 701 is guaranteed, while pressing and guiding a medium with the second roller 743, the medium passing between the scanner 701 and the calibration member 705 can be inhibited from flapping, and the medium can be conveyed without jamming in the image reading apparatus 7, so that it is possible to decrease the occurrence frequency of conveyance troubles of the medium and correctly read the image formed on the medium.

Also, since the flapping of a medium can be inhibited, the medium does not collide with the surface of the glass 723 located opposite to the calibration member 705. It is therefore possible to reduce the possibility that a superficial abrasion occurs on the glass 723 resulting from a medium. Furthermore, since the flapping of a medium can be inhibited, even if the medium is a paper sheet, dust such as paper powder is not attached to the glass 723 so that the light path of the point light source 721 is not blocked. Flaws or dust does not occur on the surface of the glass 723, and thereby the read value of the scanner 701 is not impaired.

Furthermore, since the flapping of a medium can be inhibited, it is possible to decrease the resistance to the conveyance of a medium by the use of the second roller 743. It is therefore possible to reduce the possibility that flaws occur in an image formed on a medium.

As has been discussed above, the image reading apparatus 7 makes it possible to read an image formed on a medium with a high degree of accuracy.

Furthermore, since the loading unit 745 of the image reading apparatus 7 applies a load to the second roller 743 to press a medium, while inhibiting the medium from flapping, the passing resistance of the medium can be decreased.

Furthermore, in the image reading apparatus 7, a resilient member 751 provides a resilient force to the second roller 743 so that a load can be applied to the second roller 743 by the resilient force in a simplified configuration, and thereby the loading unit 745 can be realized at a low cost.

Furthermore, in the image reading apparatus 7, the first conveyance unit 732 is located in the upstream side of the guide member 740 and arranged inclined toward the scanner 701, and the second conveyance unit 733 is located in the downstream side of the guide member 740 and arranged inclined toward the scanner 701, so that the conveying route 700 for a medium can be warped toward the scanner 701 in order to urge the medium toward the calibration member 705 when the medium is passed between the scanner 701 and the calibration member 705. By this configuration, it is possible to further inhibit the flapping of a medium.

Also, since the second conveyance unit 733 of the image reading apparatus 7 conveys a medium at a conveying speed which is faster than a conveying speed at which the first conveyance unit 732 conveys the medium, there occurs a force to pull the medium from the first conveyance unit 732 to the second conveyance unit 733 so that medium conveyance troubles can be inhibited.

Accordingly, in the image reading apparatus 7, the first roller 741 is provided in the upstream side and the downstream side of the calibration member 705 respectively, and the second roller 743 is provided in the upstream side and the downstream side of the glass 723 respectively, while a medium is receiving a force from the calibration member 705 side and a force from the glass 723 side, the second roller 743 is arranged in the glass 723 side in order that the arrangement position thereof can be varied in accordance with the stiffness of the medium, and thereby it is possible to surely hold the medium passing between the calibration member 705 and the glass 723 provided on the scanner 701 and have the medium be retracted by the thickness thereof toward the glass 723 side. By this configuration, it is possible to particularly remarkably inhibit the flapping of a medium in the reading position of the scanner 701.

Also, since the image forming system 1 is provided with the image reading apparatus 7 and the image forming apparatus 5, it is possible to decrease the occurrence frequency of conveyance troubles of a medium and accurately read an image formed on the medium in the same manner as in the image reading apparatus 7. Furthermore, since the image reading apparatus 7 can read an image formed on a medium with a high degree of accuracy so that the correction amount fed back to the image forming apparatus 5 becomes highly accurate, a highly reliable feedback system can be provided in the image forming system 1.

The image reading apparatus 7 of the present embodiment as described above is provided with the scanner 701 structured to reads an image formed on a medium which is conveyed, the calibration member 705 located opposite to the scanner 701 and structured to reflect irradiation light to be radiated to the medium when reading an image, the first roller 741 arranged in a fixed position and structured to guide the conveying direction of a medium passing between the scanner 701 and the calibration member 705, and the second roller 743 arranged in a variable position in accordance with the stiffness of a medium and structured to guide the conveying direction of the medium passing between the scanner 701 and the calibration member 705, wherein the arrangement position of the second roller 743 varies only within a range in which the reading performance of the scanner 701 is guaranteed while pressing the medium.

By this configuration, it is possible to decrease the occurrence frequency of conveyance troubles of a medium and correctly read the image formed on the medium.

Also, the image reading apparatus 7 in accordance with the present embodiment further comprises the loading unit 745 which applies a load to the second roller 743 to press a medium.

By this configuration of the image reading apparatus 7, while inhibiting the medium from flapping, the passing resistance of the medium can be decreased.

Furthermore, the image reading apparatus 7 in accordance with the present embodiment further comprises the first conveyance unit 732 located in the upstream side of the first roller 741 and the second roller 743 and arranged inclined toward the scanner 701 to convey a medium, the second conveyance unit 733 located in the downstream side of the first roller 741 and the second roller 743 and arranged inclined toward the scanner 701 to convey a medium.

By this configuration, it is possible to further inhibit the flapping of a medium in the image reading apparatus 7.

Furthermore, in accordance with the image reading apparatus 7 of the present embodiment, the conveying speed of the second conveyance unit 733 for conveying a medium is preferably set faster than the conveying speed of the first conveyance unit 732 for conveying a medium.

By this configuration, medium conveyance troubles can be inhibited in the image reading apparatus 7.

Furthermore, the image forming system 1 in accordance with the present embodiment further comprises the image reading apparatus 7 as described above, and the image forming apparatus 5 structured to form an image on a sheet P.

By this configuration, in accordance with the image forming system 1, it is possible to decrease the occurrence frequency of conveyance troubles of a medium and accurately read an image formed on the medium in the same manner as in the image reading apparatus 7.

A highly reliable feedback system can thereby be provided in the image forming system 1.

Embodiment 2

In this embodiment 2, similar elements are given similar references as in the embodiment 1, and therefore no redundant description is repeated. In the description of this embodiment 2, the internal configuration of the loading unit 745 of the embodiment 1 will be specifically explained.

Figure 16:
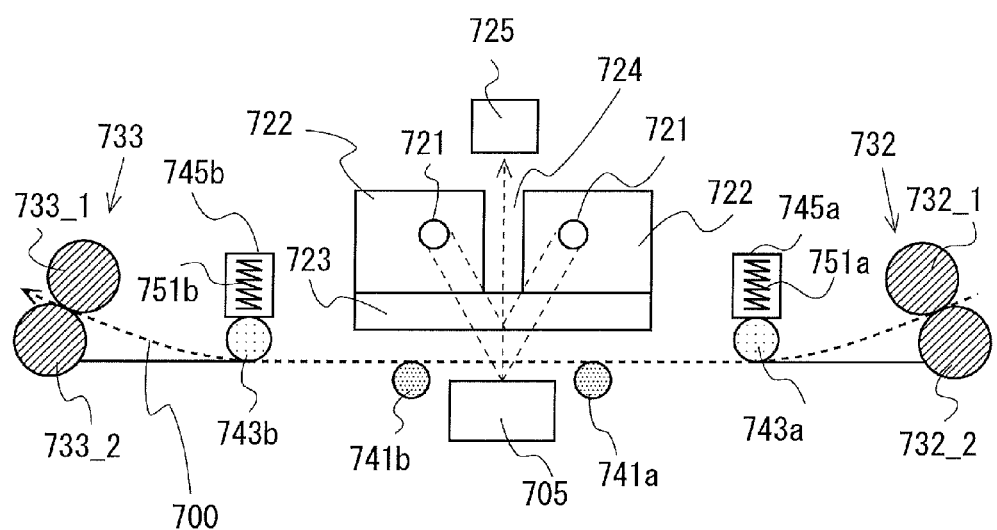
FIG. 16 is a schematic diagram for showing an example of the conveying route 700 for a medium in accordance with an embodiment 2 of the present invention.

FIG. 16 is a schematic diagram for showing an example of the conveying route 700 for a medium in accordance with the embodiment 2 of the present invention. As illustrated in FIG. 16, the loading unit 745a is provided with a resilient member 751a which generates a resilient force in response to the reaction Y applied to the second roller 743 from a medium. The resilient member 751a applies a load to the second roller 743a by the resilient force. The resilient member 751a can be formed in any configuration as long as it generates a resilient force. For example, the resilient member 751a may be formed of a coil spring, a plate spring, a spiral spring or the like metallic member. Alternatively, the resilient member 751a may be made of an elastic resin material.

Also, when a reaction Y corresponding to the stiffness of a medium is applied to the second roller 743a, the reaction Y is transmitted to the resilient member 751a through the second roller 743a in correspondence with the stiffness of the medium. The resilient member 751 thereby generates a resilient force which is then transmitted to the second roller 743a. Accordingly, since the second roller 743a can surely press the medium in accordance with the stiffness of the medium, it is possible to particularly remarkably inhibit the flapping of the medium.

Meanwhile, although located in a different position than the resilient member 751a, the resilient member 751b has a similar configuration as the resilient member 751a so that no redundant description is repeated.

Incidentally, the resilient member 751a and the resilient member 751b are referred to simply as the resilient member 751 when they need not be distinguished.

As has been discussed above, in accordance with the image reading apparatus 7 of the present embodiment, the loading unit 745 is provided with the resilient member 751 which generates a resilient force in response to the reaction Y applied to the second roller 743 from a medium, and applies a load to the second roller 743 by the resilient force.

By this configuration, the loading unit 745 can be realized at a low cost in the image reading apparatus 7.

Embodiment 3

In this embodiment 3, similar elements are given similar references as in the embodiments 1 and 2, and therefore no redundant description is repeated. In the description of this embodiment 3, the internal configuration of the loading unit 745 of the embodiment 1 will be specifically explained.

Figure 17:
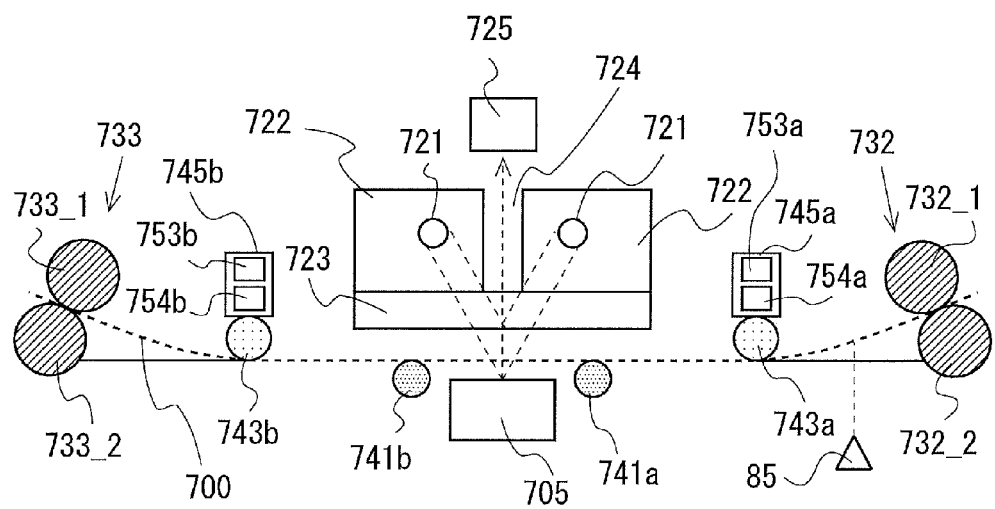
FIG. 17 is a schematic diagram for showing an example of the conveying route 700 for a medium in accordance with an embodiment 3 of the present invention.

FIG. 17 is a schematic diagram for showing an example of the conveying route 700 for a medium in accordance with the embodiment 3 of the present invention. As illustrated in FIG. 17, the loading unit 745a is provided with a drive unit 753a which generates a pressing force in accordance with the stiffness of a medium. The drive unit 753a applies a load to the second roller 743a by a pressing force when a medium is passed through the second roller 743a. A medium detection unit 85 is arranged on the conveying route 700 in the upstream side of the second roller 743a. The medium detection unit 85 consists for example of a reflection type photosensor to detect a medium which is conveyed on the conveying route 700.

For example, the timing with which a medium is passed through the second roller 743a can be obtained by detecting the medium conveyed on the conveying route 700 with the medium detection unit 85. Also, the loading unit 745a is provided with a transmission member 754a which transmits the pressing force of the drive unit 753a to the second roller 743a. The pressing force of the drive unit 753a is thereby transmitted to the second roller 743 through the transmission member 754a.

Meanwhile, although located in a different position than the drive unit 753a, the drive unit 753b has a similar configuration as the drive unit 753a so that no redundant description is repeated. Also, the transmission member 754b has a similar configuration as the transmission member 754a so that no redundant description is repeated.

Incidentally, the drive unit 753a and the drive unit 753b are referred to simply as the drive unit 753 when they need not be distinguished. Also, the transmission member 754a and the transmission member 754b are referred to simply as the transmission member 754 when they need not be distinguished.

Accordingly, the timing with which a load is applied to the second roller 743 can be controlled by applying the load of the pressing force of the drive unit 753 to the second roller 743 when the medium is passed through the second roller 743, and therefore the pressing force following the conveying speed of the medium can be applied to the medium to further inhibit occurrence of medium conveyance troubles.

As has been discussed above, in accordance with the image reading apparatus 7 of the present embodiment, the loading unit 745 is provided with the drive unit 753 which generates a pressing force in accordance with the stiffness of a medium, and the drive unit 753 applies a load to the second roller 743 by the pressing force when the medium is passed through the second roller 743.

By this configuration, a pressing force following the conveying speed of a medium is applied to the medium to further inhibit occurrence of medium conveyance troubles.

Embodiment 4

In this embodiment 4, similar elements are given similar references as in the embodiments 1 through 3, and therefore no redundant description is repeated. This embodiment 4 differs from the embodiments 1 through 3 in the arrangement positions of the first roller 741 and the second roller 743.

Figure 18:
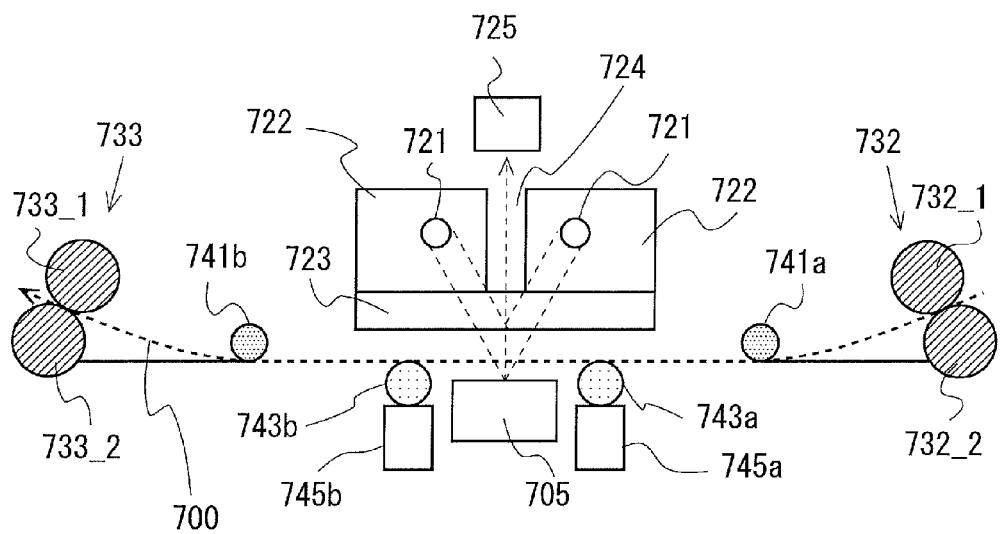
FIG. 18 is a schematic diagram for showing an example of the conveying route 700 for a medium in accordance with an embodiment 4 of the present invention.

FIG. 18 is a schematic diagram for showing an example of the conveying route 700 for a medium in accordance with the embodiment 4 of the present invention. As illustrated in FIG. 18, the second roller 743 is arranged in the upstream side and the downstream side of the calibration member 705 respectively. On the other hand, the first roller 741 is arranged in the upstream side and the downstream side of the glass 723 respectively.

Accordingly, a medium receives a force from the calibration member 705 side and a force from the glass 723 side to surely hold the medium which is passing between the calibration member 705 and the glass 723 provided on the scanner 701. Also, since the second roller 743 is located in the calibration member 705 side, the medium can be retracted by the thickness of the medium toward the calibration member 705. By this configuration, it is possible to particularly remarkably inhibit the flapping of a medium in the reading position of the scanner 701.

Incidentally, it is possible to partially combine the embodiments 1 through 4 with each other. For example, while the second roller 743 of the embodiment 1 is given a load by the resilient member 751 and the second roller 743 of the embodiment 2 is given a load by the drive unit 753, it is possible to apply a load from the resilient member 751 to either one of the second rollers 743a and 743b arranged in the upstream side and the downstream side of the glass 723 respectively and apply a load from the drive unit 753 to the other second roller.

Furthermore, in accordance with the image reading apparatus 7 of one of the embodiments 1 through 3, while either one of the first roller 741 and the second roller 743 is provided in the upstream side and the downstream side of the calibration member 705 respectively, and the other of the first roller 741 and the second roller 743 is provided in the upstream side and the downstream side of the glass 723 respectively, while a medium is receiving a force from the calibration member 705 side and a force from the glass 723 side, the second roller 743 is arranged in either one of the calibration member 705 side and the glass 723 side in order that the arrangement position thereof can be varied in accordance with the stiffness of the medium, and thereby it is possible to surely hold the medium passing between the calibration member 705 and the glass 723 provided on the scanner 701 and have the medium be retracted by the thickness thereof toward the glass 723 side or the calibration member 705. By this configuration, it is possible to particularly remarkably inhibit the flapping of a medium in the reading position of the scanner 701.

The image forming apparatus 5 and the image reading apparatus 7 have been explained based on the embodiments in accordance with the present invention. However, it is not intended to limit the present invention to the precise form described, and obviously many modifications and variations are possible without departing from the scope of the invention.

For example, while a sheet P is conveyed in a horizontal direction and located between the spectrophotometer 703 and the calibration member 705 in the vertical direction in accordance with the examples of the above embodiments, the present invention is not limited thereto. For example, a sheet P can be conveyed in the vertical direction and located between the spectrophotometer 703 and the calibration member 705 in a horizontal direction.

Also, while the image reading signal Sout of the above embodiment is given as digital image data (RGB code) defined in the RGB color space, it is not limited thereto but can be defined in another color space such as the L*a*b* color space.

Furthermore, while the imaging device 725 consists of CCDs in the above explained examples, CMOSs can be used instead. In other words, the imaging device 725 can be formed of any photoelectric conversion device.

Furthermore, while the medium is a paper sheet P in the above explained examples, films, labels and fiber mediums can be used instead.

Furthermore, while the first conveyance unit 732 and the second conveyance unit 733 consist of the rollers 732_1, 732_2, 733_1 and 733_2 in the above explained examples, these conveyance units can consist of belts. Incidentally, the first conveyance unit 732 and the second conveyance unit 733 may be formed of either metallic rollers or rubber rollers. For example, while the conveyance roller 732_1 is formed of a rubber roller, the conveyance roller 732_2 is formed of a metallic roller.

Also, while the arrangement position of the second roller 743 is variable in accordance with the stiffness of a medium as explained in the above description, the second roller 743 may alternatively be arranged in order that the arrangement position thereof is variable in accordance with the paper density of the medium and the size of the medium.

Furthermore, while the first conveyance unit 732 and the second conveyance unit 733 are inclined at an angle of 10 degrees in the above explanation, the inclination is not limited thereto. In addition, the inclination of the first conveyance unit 732 is not necessarily equal to the inclination of the second conveyance unit 733.

Furthermore, while the resilient member 751 and the drive unit 753 are explained as examples of the internal configuration of the loading unit 745, the internal configuration is not limited thereto as long as the loading unit 745 can apply a load to the second roller 743 to press a medium.

What is claimed is:

1. An image reading apparatus comprising:
   a scanner structured to read an image formed on a medium which is conveyed;
   a calibration member located opposite to the scanner and structured to reflect irradiation light to be radiated to the medium when reading an image;
   a first roller arranged in a fixed position and structured to guide a conveying direction of the medium passing between the scanner and the calibration member; and
   a second roller arranged in a variable position in accordance with the stiffness of the medium and structured to guide the conveying direction of the medium passing between the scanner and the calibration member,
   wherein the arrangement position of the second roller varies only within a range in which the reading performance of the scanner is guaranteed while pressing the medium.

2. The image reading apparatus of claim 1 further comprising:
   a loading unit which applies a load to the second roller to press the medium.

3. The image reading apparatus of claim 2 wherein
   the loading unit is provided with a resilient member which generates a resilient force in response to a reaction which is applied to the second roller from the medium, and wherein
   the resilient member applies the load to the second roller by of the resilient force.

4. The image reading apparatus of claim 2 wherein
   the loading unit is provided with a drive unit which generates a pressing force in accordance with the stiffness of a medium, and wherein
   the drive unit applies the load to the second roller by the pressing force when the medium is passed through the second roller.

5. The image reading apparatus of claim 1 further comprising:
   a first conveyance unit located in the upstream side of the first roller and the second roller and arranged inclined toward the scanner to convey the medium; and
   a second conveyance unit located in the downstream side of the first roller and the second roller and arranged inclined toward the scanner to convey the medium.

6. The image reading apparatus of claim 5 wherein
   the conveying speed of the second conveyance unit for conveying the medium is set faster than the conveying speed of the first conveyance unit for conveying the medium.

7. The image reading apparatus of claim 1 wherein
   the scanner comprises:
   a point light source structured to irradiate the medium with the irradiation light;
   a light guide member structured to guide light which includes reflected light originating from the irradiation light of the point light source;
   a glass provided on the light guide member and arranged opposite to the calibration member; and
   an imaging device structured to image the image formed on the medium with light which is guided by the light guide members and through the glass, wherein
   one of the first roller and the second roller is located in the upstream side and the downstream side of the calibration member respectively, and
   the other of the first roller and the second roller is located in the upstream side and the downstream side of the light guide member respectively.

8. An image forming system comprising:
   the image reading apparatus as recited in claim 1; and
   an image forming apparatus structured to form the image on the medium.

* * * * *